D. C. LINK.
PROCESSES FOR PRESERVING MEATS.
No. 194,693. Patented Aug. 28, 1877.
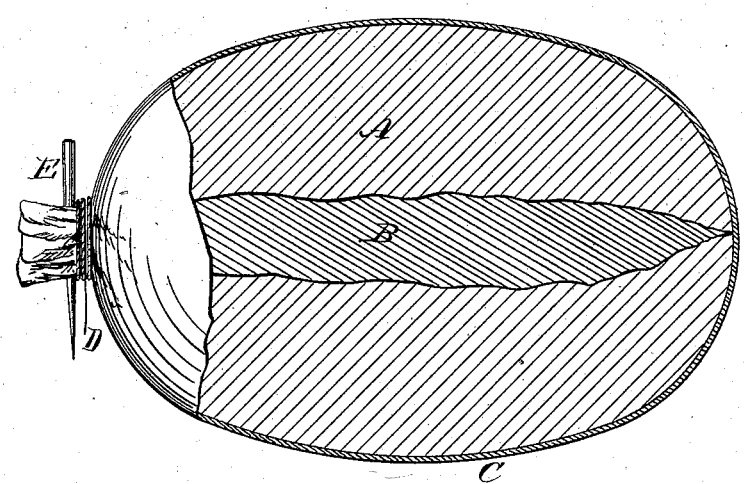
WITNESSES:
Chas. Nida
J. H. Scarborough
INVENTOR:
D. C. Link.
BY Munn & Co
ATTORNEYS.

UNITED STATES PATENT OFFICE.

DAVID C. LINK, OF NEW YORK, N. Y.

IMPROVEMENT IN PROCESSES FOR PRESERVING MEATS.

Specification forming part of Letters Patent No. 194,693, dated August 28, 1877; application filed July 30, 1877.

*To all whom it may concern:*

Be it known that I, DAVID C. LINK, of the city, county, and State of New York, have invented a new and Improved Process for Preparing Hams, of which the following is a specification:

My invention relates to a new process of putting up and preserving hams.

In carrying out my invention I take a sweet-pickled ham and cut the shank entirely off, and then withdraw every particle of bone and fill the vacancy caused thereby with a piece of lean meat, such as ham, loin, or tongue, which has been previously pickled. I then take the ham and press it into a bladder, which has been expressly cleaned for the purpose, through as small an aperture as possible, and tie the opening tightly together, this process being facilitated by the use of a skewer. I then wind the bladder containing the ham in different directions with a strong cord, to give the ham a symmetrical form. I then hang it over a smoking fire until it is sufficiently browned, after which it is boiled for about three hours. I next smear the bladder with sirup, for the purpose of closing any holes therein and perfectly excluding the air; also to provide a coat, which will be subsequently available for covering the meat should it be exposed at any point by piercing the bladder with a "trier" or other instrument for testing the quality of the meat. After thus coating the ham it is chilled by placing it in a cool room. The cord is then removed and the ham is ready for use.

In the accompanying drawing, which represents a ham partly in section, A is the ham; B, the inserted piece; C, the bladder; D, the binding-cord; and E the skewer.

It will be observed that my process differs in various ways from that usually employed in preserving hams.

By my process the ham is smoked and boiled and coated with sirup while still inclosed in the case or bladder, and is thus not only preserved but prepared for immediate use upon the table.

In putting up the ordinary "sugar-cured" ham it is smoked before being sewed into a canvas bag, but is not boiled, and hence requires to be cooked after coming into the hands of the consumer.

Again, hams put up according to my process are smoked but about one-sixth of the time (two hours) required to preserve the sugar-cured hams, since the smoking and boiling together with the subsequent inclosure in an air-tight and closely-fitting skin renders longer smoking unnecessary; and the quality of the hams is thus improved, since long smoking tends to harden and impair their flavor and delicacy.

Another advantage is derived from the ham being smoked and boiled—that is to say, completely cooked, while contained in the bladder, namely—the juices of the meat are preserved and prevented from escaping, so that they tend to soften the skin adhering to the ham and render it soft and jelly-like in place of hard, dry, and unpalatable, as when cured and preserved by the ordinary processes.

Further, the bladder, being always drawn tightly together at the slit or opening, is made to fit snugly around the ham, and, being very thin and also transparent, it permits inspection of the ham to the extent of perceiving whether it is fat or lean, which is frequently a matter of importance to the purchaser to prevent mistake or imposition.

The skin covering adhering to the ham, and likewise presenting no objectionable appearance, does not require to be removed to prepare the ham for the table; but slices may be cut off and even served with a portion of the bladder attached to the edge.

I desire to state that while I prefer to insert a piece of meat in the cavity formed by extraction of the bone, I do not restrict myself to that as an indispensable step of my process; but, on the other hand, while I greatly prefer the practice, I do not claim it is new to extract bones from meat by withdrawing them in place of cutting them out by slicing through the meat down to the bones; nor do I claim, broadly, putting up meat in the intestines of swine or other animals, since I am aware chopped meats have been preserved in that manner.

What I claim is—

The improved process of preserving hams and preparing them for immediate use, substantially as hereinbefore described, the same consisting in first removing the bone from the previously-pickled ham, then placing it in a bladder and smoking and boiling it while so inclosed, and subsequently coating the bladder with sirup, as set forth.

DAVID C. LINK.

Witnesses:
  C. SEDGWICK,
  GEO. M. HOPKINS.